Sept. 30, 1969      S. G. PETURSSON      3,469,595
FLUID-PRESSURE EQUALIZING AND MIXING VALVES
Filed May 10, 1967
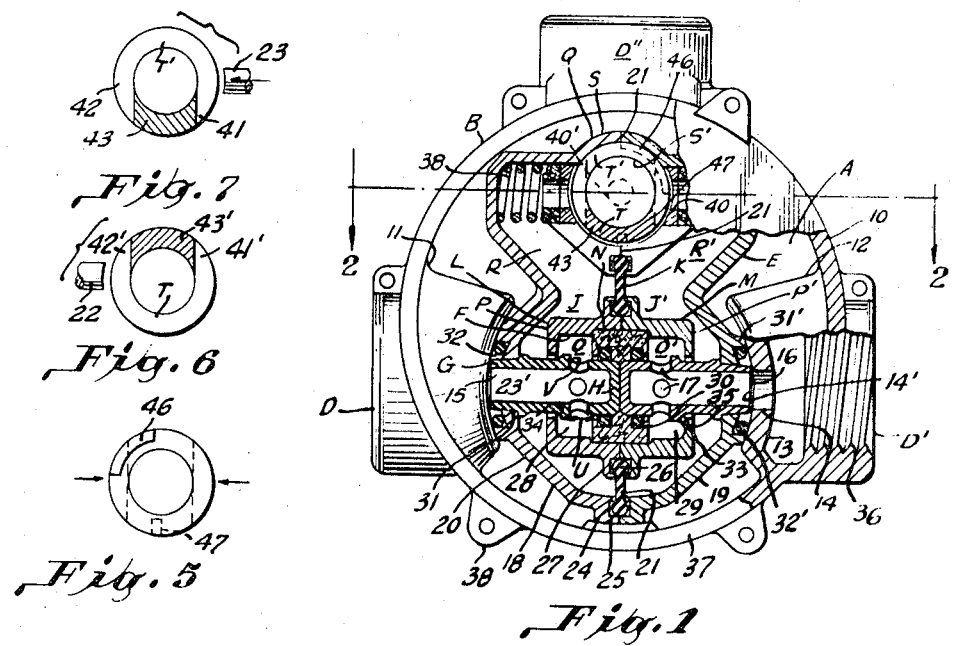
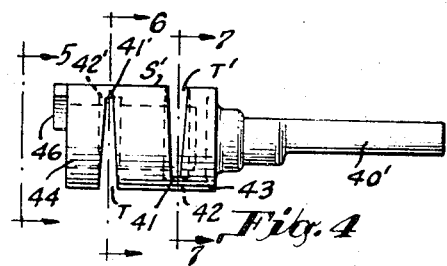
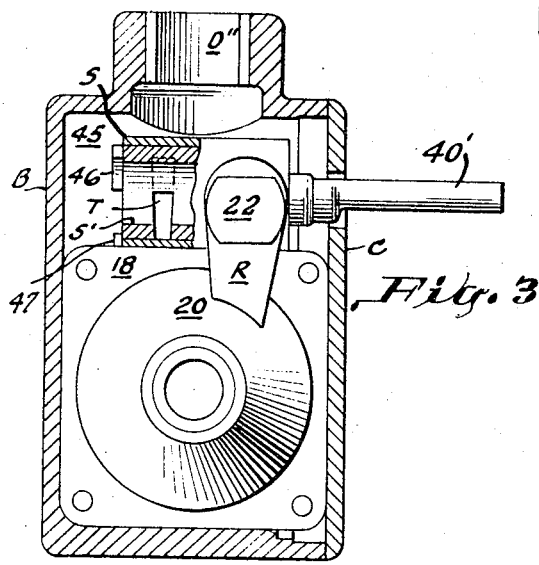
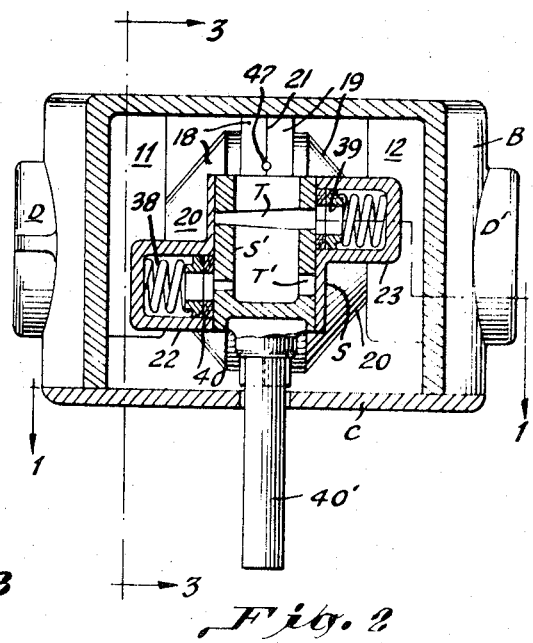
INVENTOR
Sigurdur G. Petursson

United States Patent Office 3,469,595
Patented Sept. 30, 1969

3,469,595
FLUID-PRESSURE EQUALIZING AND MIXING VALVES
Sigurdur G. Petursson, Cooksville, Ontario, Canada, assignors to Danfosss Manufacturing Co. Ltd., Port Credit, Ontario, Canada, a corporation of Canada
Filed Mar. 10, 1967, Ser. No. 622,372
Int. Cl. G05d *23/13, 11/20;* F16k *11/16*
U.S. Cl. 137—100
6 Claims

ABSTRACT OF THE DISCLOSURE

The entitled invention wherein an annular diaphragm secured in a casing divides it into hot and cold water chambers. A valve housing having hot and cold water chambers is slidable on stationary aligned co-axial delivery tubes spanning the casing and intersecting the diaphragm, the housing being sealed to the inner rim of the diaphragm. Ports in the tubes communicate with the housing chambers, and valve seats on the housing and tubes co-operate to control volume discharged from the housing chambers into the casing chambers. An associated stem valve has opposite annular tapering hot and cold water slots so that rotation increases the temperature ratio without appreciably changing volume.

BACKGROUND OF THE INVENTION

Field of the invention

The art to which this invention pertains is that of fluid equalizing, balancing or proportioning, and to fluid mixing, all in connection with such factors as relative pressure, volume, temperature and the like. As particularly exemplified herein however, the inventive concept is applied to hot and cold water pressure equalization and maintenance, together with subsequent mixing and delivery in steadily increasing or decreasing proportions (while maintaining equality of pressure) of either hot or cold water responsive to the continuous movement of a valve for this purpose in one direction or another under conditions in which it is assumed that the temperature of the hot and cold water is constant, but subject to main line pressure variation.

SUMMARY OF THE INVENTION

As exemplified, the invention is for the pressure-equalization, at a junction-point of two separate streams of water, one of which is hot and the other cold, and for the mixing of said streams in any desired proportion of one to the other for purposes such as shower-baths and other uses where such control is desired. It consists of a fluid valve assembly generally designated A comprising an enclosing container B having a cover place C, the container having hot and cold (or vice versa) intake ports D and D', and a mixed water discharge port D''.

Within the container is a casing collectively designated E enclosing chambered valve means collectively designated F. Such valve means comprises, essentially, apertured ducting means G communicating with ports D and D', with a central barrier means H separating G into two co-axial parts, or otherwise stated, into a pair of opposed and rigidly fixed, preferably plastic flow-tubes each having an externally projecting annular, valve seating thereon.

Dividing the interior of casing E into hot and cold balance-maintaining pressure-chambers J and J' is a yieldable, annular diaphragm K to which is secured another portion L of the valve means F, specifically a cylindrical housing M having a centrally disposed dividing wall N whereby the interior of M is divided into a pair of primary or pressure-change sensing hot and cold water chambers O and O'. End walls P and P' have seatings engageable with those on G aforesaid.

It follows that if, for example, the cold water pressure at D' should become greater than at D, the valve seatings controlling discharge from O' would tend (and in general only tend) to close, due to the tendency of housing M to move leftwardly (see FIGURE 1). Such tendency of the housing to move leftwardly is caused by the pressure build-up indicated by U between the inner shoulder V and the interfacing inner annular surface portion of wall N but on the high pressure side. Thus, correction of any pressure inbalance would immediately be commenced, before any, or any material increase of pressure is felt in chamber J'. The chambers J–J' and the diaphragm K, function to (a) maintain separation of the hot and cold water until mixed as presently to be explained, (b) complete correction of the pressure imbalance, the commencement of which correction is effected in chambers O–O' and (c) maintain a balanced condition in chambers J–J' opposed to the net force in chamber O. It the pressure drop is substantial, a chamber O is temporarily closed off until pressure is restored.

Mutually offset hot and cold water conduits R and R' communicate between chambers J and J' and cylindrical mixing valve boxing S which is provided with correspondingly offset and diametrically opposed inlet ports. Within this boxing is a rotatable and hollow valve element S', the stemmed end of which is closed, and the opposit end open. Spaced, semi-annular slots T and T' are formed in element S'. Each of such slots increases in width from one end to the other in opposite directions of location (see FIGS. 4, 6, and 7), the slots also being in substantial degrees of opposition to each other, and shown herein as diametrically opposed.

Thus it follows that upon rotation of element S' anti-clockwise (with reference to FIGS. 1 and 4 as viewed from the right end of the latter) cold water volume will be gradually diminished as slot T' also moves anti-clockwise from its big end to its small end, while hot water volume increases due to a reverse happening in slot T.

The water thus mixed within element S' exits therefrom and into the container B around the casing E before flowing from D''.

In view of the foregoing abstract, background of the invention, summary and all such objects, purposes or advantages as may be discerned from this disclosure and specification, the present invention consists of the inventive concept embodied in the method, process, construction, arrangement of parts, or new use of any of the foregoing, all as herein particularly exemplified in one or more specific embodiments of such concept, reference being had to the accompanying drawings in which FIGURE 1 is a front, predominantly sectional elevation of the present invention, substantially on the line 1—1 of FIGURE 2.

FIGURE 2 is a sectional plan of the invention substantially on the line 2—2 of FIGURE 1.

FIGURE 3 is a sectional elevation substantially on the line 3—3 of FIGURE 2.

FIGURE 4 is a side elevation of the rotatable valve element per se.

FIGURE 5 is a representation of the element of FIGURE 4 as viewed from 5—5 of FIGURE 4.

FIGURE 6 is a section on the line 6—6 of FIGURE 4, showing the associated parts schematically.

FIGURE 7 is a section on the line 7—7 of FIGURE 4, showing the associated parts schematically.

In the drawings, like characters of reference designate similar parts in the several figures, and in the following description of the preferred embodiment, reference characters, terms and expressions used in the foregoing summary may be substituted and/or supplemented by those which follow, all without prejudice to either.

DESCRIPTION OF THE PREFERRED EMBODIMENT

The design of the herein disclosed embodiment of the invention has been based upon a cold water supply of approximately 50° F., and a hot water supply of approximately 150° F. Accordingly, when the mixing valve subassembly Q is in the initial opening position, the valve element S' thereof is in a position which is some 45° clockwise from the position depicted in the accompanying FIGURE 1. As the element S' is rotated counterclockwise with respect to the accompanying FIGURE 1, the temperature increases to a maximum represented by rotation of approximately 180° from the indicated position, it being understood that the stem is capable of rotation through approxibately 270° as will be explained in greater detail hereinafter.

Container B is generally cylindrical, the ports D, D' and D" being cast integral with the cylindrical portion 10, with inwardly projecting cavity portions 11 and 12 extending interiorly with respect to container B and having concave interior wall portions 13, centrally apertured as at 14 to register with the outer ends 14' of the ducting means G taking the form of the pair of axially aligned, abutting flow tubes 15 and 16, each provided with an annular ring of discharge apertures 17, the barrier means H constituting the inner abutting end walls of the two tubes.

Casing E is essentially comprised of a pair of shell portions 18 and 19 of the configuration essentially to be discerned by inspection of the accompanying FIGURES 1, 2 and 3. The lower portion 20 of each shell is of substantially frusto-conical configuration the two shells being held by conventional means in sealed relationship at their central parting edge 21. The upper part of the shell is formed of the mixing valve boxing S which is open at both ends thereof as will be seen from the accompanying FIGURE 2, while the conduits R and R' diverge upwardly and outwardly from the portions 20 to terminate in the axially horizontal parallel and mutually offset port housings 22 and 23, communicating with the interior of boxing S. The tubes 15 and 16 extend through the lower portions 20 of the shell-portions 18 and 19, and near the outer ends of each tube is an annular shoulder 23' which abuts the depicted material of the adjacent shell-portion.

Diaphragm K is suitably secured via the outer perimetrical bead 24 thereof within an annular channel 25 formed on the parting plane of the two shells 18 and 19, which plane has previously been designated as a parting edge 21. The inner perimeter of the diaphragm K is also beaded as at 26 for reception within the central annular flange 27 projecting from the outer surface of cylindrical valve housing M. The twin hot and cold chambers 28 and 29 of housing M are formed by the barrier means N, and the end-walls P already referred to. In greater specificity however, barrier means N is a brass cylinder, or annulus of other suitable material, provided with the pair of interior grooves clearly shown in the accompanying FIGURE 1, wherein reside O-rings 30 of rubber or the like in virtue of which valve housing M may move or slide to right or left along the flow tubes 15 and 16 from the central position depicted in the accompanying FIGURE 1, while the chambers 28 and 29 remain fluid-tight as between them.

Flow tubes 15 and 16 may be of a variety of materials, preferably Delrin. The outer ends are tapered as at 31 to fit the indicated complementary seatings in the shell-portions 18 and 19. Surrounding and spaced from the tapered ends, projecting outwardly and integral with the shell-portions are annular flanges 31' enclosing within the annular chambers 32, O-rings 32' whereby the outer, open tapered ends 31 are sealed off from the space later to be referred to, between the shell-portions 18 and 19 and the cylindrical portion 10. Each flow tube 15 and 16 is provided with the annular valve seating 33 on the external side of the ring of ports 17, these seatings each having an outer bevelled surface 34 engageable with the adjacent edge 35 of the end-walls P, and the aforesaid vertical inner shoulder portion V. It will thus be apparent that the tubes 15 and 16 communicate with the internally screw-threaded apertures 36 in the cavity portions 11 and 12. Cover plate C is of course suitably gasketed against the flange 37 of container B and secured thereto as by means of the apertured lugs 38.

Within each of the port housings 22 and 23 is a spring 38 bearable against a gland 39 which in turn bears against a sealing ring 40 the interior surface whereof is not only annular but concave so as to conform with the curvature of the valve element S'. The aforesaid springs of course bias the rings 40 against the element and thereby prevent leakage of hot or cold water between the element and the surrounding boxing. Projecting from one end of the rotatable valve element S' is the stem 40' to which a manually operable handle (not shown) may be secured. The slots T and T' in element S' are of approximately 270° circumference between the narrow ends 41, and 41', and the wide ends 42 and 42' respectively so that the connecting lands 43 and 43' are approximately 90° in circumference. In virtue of the configuration of the slots T and T' as described and illustrated, it will be apparent that water may be mixed within the valve chamber 44 and move out into the interstices and spaces 45 between container B and casing E before exiting through D". It should be explained that the length and relative disposition of the aforesaid slots T and T' may be varied considerably, as also the disposition of their widenings and convergences upon the length thereof.

Upon the rear end of the element S' is positioned a narrow, projecting, sectorial lug 46 which may (arbitrarily) have a circumference of approximately 90°. Such lug is intended to be interceptible by an upstanding pin 47. By best reference to the accompanying FIGURE 1, it will be apparent that when valve element S' is rotated clockwise approximately 90°, the leading end of lug 46 will come up against pin 47, and at such location the lands 43 and 43' will block the outlet ports in the sealing rings 40.

CONCLUSION

From the foregoing it will be apparent that water is mixed in the element S' according to the widths in the slots T and T' presented to the ports in the housings 22 and 23 from the equalized pressure chambers J and J'. As the element or spool is rotated counter-clockwise the slot-width presented to the cold water housing 23 will decrease while the width presented to the hot water housing 22 will increase, and vice versa. As most hot water tank installations are thermostatically set for a given temperature, the hot water temperature can generally be considered constant, and the same may be said approximately to apply for cold water. In fact the present valve assembly will have its greatest usefulness in such as showers, between temperatures of 90° and 110° F. However the invention will operate satisfactorily even with hot and cold temperatures of 190° F. and 40° F.

The total flow of water may change somewhat in turning from one extreme of rotation to the other, but this is a function of the design of the slots. The mixed flow will be inherently approximately constant as the purpose of the valve assembly is to provide control over the outflow temperature rather than the rate of flow of mixed water. Volumetric control could of course be accomplished by a separate control on the shower head itself, and such controls are commercially available.

If the slots T and T' were altered so that the small ends of both were first presented to the ports 22 and 23 then the invention would function as a volume control means. In such situation however temperature would be constant due to the fact that the hot and cold supply temperatures would likewise be constant and pressure fluctuations would be controlled in the manner described. Volume control by the modification just suggested would be useful in controlling the flow of a mixture of fluids such as in chemical mixing or for boiler feed water supply. Within the concept herein disclosed many industrial variations are possible.

In general, the barrier means N, and the housing M act as a unit and move axially along the flow tubes 15 and 16 to open and throttle the ports created between the edges 35 and the surfaces 34. As one outlet is opening, the other closes. The water pressure within one of the chambers 28 or 29 will attempt to move the barrier means N in the direction which will throttle off the flow of high pressure water. When the water flows from one of the chambers 28 or 29 it will proceed from thence into the chambers J and J' and act on the diaphragm K so as to move the concerned edge 35 in a direction which effects water throttling as aforesaid. Under normal conditions water will flow equally between each of the pairs of seats 34 and 35 so that equalized pressures will obtain on either side of the diaphragm.

If cold water pressure $P_1$, and hot water pressure $P_2$ act inside their respective chambers 28 or 29, the net force is the result of the pressures acting on the annular faces of the barrier means N which is not balanced by the openings between the seat.

If the net area $A_n$ is the area of the annular end surfaces of the dividing wall N considered as extending between the cylindrical inner surfaces of the housing M, and the outer surfaces of the flow tubes, less the annular surfaces which extend between the edges 35, and the aforesaid surfaces of housing M, then the net force will be:

$$F_s = A_n (P_1 - P_2) \qquad (I)$$

Due to the chosen terms, it will be apparent that if the expression is positive, then the cold water supply will be throttled, and if the expression is negative, the hot water supply will be throttled. $F_s$ will be zero when $P_1$ and $P_2$ are equal.

If the pressures in the mains are unequal ($P_c$ and $P_h$) then $P_1$ and $P_2$ will vary accordingly and there will be a tendency to throttle the flow of the higher pressure proceeding into the concerned diaphragm chamber J or J'. The area $A_d$ which is subject to the pressure in the diaphragm chambers is that annulus contained between the seat openings (around the flow tubes) and the internal diameter of the shell (18 or 19) where it meets the web of the diaphragm K. Thus, if the pressures in the diaphragm chambers on the cold and hot sides are $P_3$ and $P_4$ respectively, then it will be seen that opposing forces act across the diaphragm, and the net force $F_d$ will be:

$$F_d = A_d(P_3 - P_4) \qquad (II)$$

for equilibrium:

$$F_d = F_s$$

(but act in opposite directions and thus one is the negative of the other) hence:

$$P_3 - P_4 = \frac{A_n}{A_d}(P_1 - P_2) \qquad (III)$$

From (III) it will be obvious that when pressure equalization of $P_3$ and $P_4$ is referred to equalization within the physical constructed limitations of the area ratios and the uncontrollable pressure variations in the mains supply is intended.

The area ratios are set in the design and production of the valve assembly, and if they are, say, in the ratio of 1:40 then the equalized pressures have a differential of 2½% of the inlet differential, e.g.:

$$P_c = 20 \text{ p.s.i.}$$
$$P_h = 60 \text{ p.s.i.}$$

then:

$$P_3 - P_4 = .025 \times (20 - 60) = -1 \text{ p.s.i.}$$

Thus it is apparent that the pressure is equalized to 1 p.s.i. even though the inlet pressures differ by 40 p.s.i. The negative value obtained merely indicated that, due to this 1 p.s.i. difference, there will be an increase in temperature.

It can be further shown, from the above example, that if there is a 1 p.s.i. pressure differential, and it can be expected that the pressures $P_3$ and $P_4$ will be in the neighborhood of the 20 p.s.i. value, that the temperature increase would be expected to be approximately one-quarter of one degree Fahrenheit (considering flow quantity to be made up of equal parts of hot and cold water, and considering that the velocity of flow is proportional to $\sqrt{h}$). In actual practice, it would be greater since considerations such as friction, or other losses in sliding contacts, water turbulence, energy absorption, or inertia effects have not been taken into account.

From the foregoing it will accordingly be apparent that if the operation of achieving balanced pressures is effected by throttling the higher inlet supply pressure, then the operation will be improved if this can be achieved without the need to wait for the diaphragm chambers J or J' to sense the change and commence corrective action. It will be apparent that this has been achieved by arranging that the inlet pressures enter chambers 15 and 16 before throttling commences but which chambers can effect a movement of the diaphragm. Thus before any pressure increase is registered in the diaphragm chambers J and J' the seat chamber pressure has started to compensate for the change. It only remains for the diaphragm chambers to complete and maintain the balance. Accordingly it will be apparent that in effect, a forecasting of diaphragm pressure change has been achieved and corrective action taken before the equalized pressures are influenced.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. A fluid valve assembly comprising:
   a ported casing having a pair of apertured ducts extending therein and having valve seatings thereon,
   a chambered valve member slidably positioned on said ducts having valve portions cooperating with said valve seatings to control flow from said apertured ducts to the interior of said casing, and
   a diaphragm extending between said chambered valve member and said casing dividing said casing into two portions,
   said chambered valve member being responsive to pressure differential between fluid in said ducts to move in a direction to throttle the flow at the higher pressure side and augment the flow at the lower pressure side,
   said diaphragm being responsive to pressure differential between said two portions to move said chambered valve member in a direction reducting said pressure differential.

2. A fluid valve assembly as set out in claim 1 wherein said chambered valve member comprises a cylindrical housing divided into two chambers by a central dividing wall.

3. A fluid valve assembly as set out in claim 2 wherein said valve portions are formed by end walls of said cylindrical housing.

4. A fluid valve assembly as set out in claim 3 wherein said valve portions are radially inwardly directed walls and the cooperating valve seatings are radially outwardly directed flanges.

5. A fluid valve assembly as set out in claim 2 wherein said ducts are aligned and separated by a central barrier, each duct having at least one aperture communicating with a corresponding chamber in the slidable valve member.

6. The improvements according to claim 2 which:
   (I) include a container enclosing said casing; and
   (II) conduits (R) extending within said container from said casing to a:
   (III) fluid mixing valve sub-assembly, said sub-assembly essentially comprising:
   (a) a cylindrical boxing having:
      (i) offset inlet ports therein on substantially diametrically opposite points thereon communicating with said conduits, and
      (ii) at least one open end,
   (b) a cylindrical rotatable valve element within said boxing characterized by having
      (i) spaced, semi-annular slots therein each of which increases in width from one end to the other in opposite directions of rotation, said slots being in substantial degrees of opposition to each other, and
      (ii) an open end at least at the open end of said boxing.

References Cited

UNITED STATES PATENTS

| | | | |
|---|---|---|---|
| 962,111 | 6/1910 | Assmann | 137—111 XR |
| 1,792,906 | 2/1931 | Heilos | 137—625.41 XR |
| 2,145,114 | 1/1939 | Gibbs | 137—87 |
| 2,808,848 | 10/1957 | Cooper | 137—100 |
| 2,874,715 | 2/1959 | Richards | 137—111 XR |
| 3,113,581 | 12/1963 | Presnell | 137—101 |
| 3,169,549 | 2/1965 | Quick | 137—625.41 XR |

HAROLD W. WEAKLEY, Primary Examiner

U.S. Cl. X.R.

137—454.6, 625.12, 625.41; 251—174